US008650157B1

(12) United States Patent
Jha et al.

(10) Patent No.: US 8,650,157 B1
(45) Date of Patent: Feb. 11, 2014

(54) SYSTEMS AND METHODS FOR DEDUPLICATING DATA TRANSFERRED VIA PHYSICAL STORAGE MEDIA

(75) Inventors: Mohit Jha, Maharashtra (IN); Deepak Tanksale, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 297 days.

(21) Appl. No.: 12/703,468

(22) Filed: Feb. 10, 2010

(51) Int. Cl.
*G06F 7/00* (2006.01)
*G06F 17/00* (2006.01)

(52) U.S. Cl.
USPC .......................... 707/640; 707/661; 707/664

(58) Field of Classification Search
USPC ....................................................... 707/697
See application file for complete search history.

(56) References Cited

U.S. PATENT DOCUMENTS

| | | | | |
|---|---|---|---|---|
| 7,962,452 B2 * | 6/2011 | Anglin | ........................... | 707/645 |
| 2010/0033240 A1 * | 2/2010 | Denison et al. | ................... | 330/9 |
| 2010/0088486 A1 * | 4/2010 | Wideman | ...................... | 711/173 |
| 2010/0094817 A1 * | 4/2010 | Ben-Shaul et al. | ........... | 707/697 |
| 2010/0268960 A1 * | 10/2010 | Moffat et al. | ................. | 713/181 |
| 2010/0332401 A1 * | 12/2010 | Prahlad et al. | ................... | 705/80 |
| 2011/0055471 A1 * | 3/2011 | Thatcher et al. | .............. | 711/114 |

OTHER PUBLICATIONS

Iron Mountain; Server Backup Advanced Options; http://www.ironmountain.com/online-backup/server/server-backup-advanced-options.html; Taken from site Nov. 23, 2009.

\* cited by examiner

*Primary Examiner* — Ajay Bhatia
*Assistant Examiner* — Cheryl M Schechtman
(74) *Attorney, Agent, or Firm* — ALG Intellectual Property, LLC (57) ABSTRACT

A computer-implemented method for deduplicating data transferred via physical storage media may include: 1) identifying data stored at a first location that is to be transferred to a second location via a physical storage medium, 2) deduplicating the identified data, 3) storing the deduplicated data on the physical storage medium, and then, after the physical storage medium has been physically transported from the first location to the second location, 4) transferring the deduplicated data from the physical storage medium to a storage device at the second location.

16 Claims, 6 Drawing Sheets

SYSTEMS AND METHODS FOR DEDUPLICATING DATA TRANSFERRED VIA PHYSICAL STORAGE MEDIA

BACKGROUND

In recent years, the popularity and prevalence of cloud-based and other online storage systems has increased dramatically. Cloud-based storage systems offer virtually unlimited storage and worldwide access to data via the Internet to users, applications, and services.

Unfortunately, some potential users of cloud-based storage systems may be hesitant to begin using such storage systems due to the amount of time and resources that may be required to complete an initial transfer of data to these storage systems via the Internet or other networks. For example, a large enterprise may wish to store potentially hundreds of terabytes of data on a cloud-based storage system. While subsequent additions or modifications to this data may be transferred to the cloud-based storage system relatively quickly, the initial transfer of such a large data set may take days or weeks to complete, potentially consuming unacceptable amounts of the enterprise's computing and/or networking resources. Similar problems may also occur when large numbers of customers simultaneously request the restoration or transfer of large amounts of data from the same cloud-based storage system.

Some cloud-based storage vendors have attempted to overcome such issues by providing their customers with physical media (such as DVDs, USB flash drives, hard drives, or the like) with instructions to store the data that is to be transferred to the storage vendor on the physical media and then return the same to the storage vendor. Unfortunately, given the large amounts of data involved, cloud-based storage vendors may be required to provide their customers with potentially hundreds of physical media in order to facilitate such data transfers, potentially incurring significant costs. As such, the instant disclosure identifies a need for reducing the costs associated with transferring data from one location to another via physical storage media.

SUMMARY

As will be described in greater detail below, the instant disclosure generally relates to systems and methods for deduplicating data transferred via physical storage media. In one example, the various systems described herein may accomplish such a task by: 1) identifying data (such as data to be backed up to or restored from a cloud-based storage system) stored at a first location that is to be transferred to a second location via a physical storage medium, 2) deduplicating the identified data, 3) storing the deduplicated data on the physical storage medium, and then, after the physical storage medium has been transported from the first location to the second location, 4) transferring the deduplicated data from the physical storage medium to a storage device at the second location.

The systems described herein may deduplicate the identified data either before or after storing the same on the physical storage medium. In some examples, these systems may deduplicate the identified data using a deduplication agent (such as, e.g., SYMANTEC's NETBACKUP PUREDISK) preloaded or stored on the physical storage medium (by, e.g., a storage vendor).

In one example, the systems described herein may, during the deduplication process, determine whether an instance of at least one data element within the identified data has been previously transferred to the storage device at the second location. For example, the systems described herein may: 1) determine whether an instance of at least one data segment within the identified data has been previously stored (by, e.g., the same or an additional customer) on the storage device at the second location and then, if so, 2) create a reference to the instance of the data segment that is stored on the storage device at the second location, as opposed to storing the identified data segment on the physical storage medium, in order to conserve storage space. In this example, the systems described herein may determine whether an instance of at least one data segment within the identified data has been previously stored on the storage device at the second location by, for each data segment within the identified data: 1) creating a hash of the data segment, 2) using the hash to query the storage device at the second location, and then 3) receiving a response from the storage device that indicates whether an instance of the data segment has been previously stored on the storage device.

In some embodiments, the systems described herein may store the deduplicated data on the physical storage medium in an encrypted format that permits subsequent cross-client deduplication. For example, the systems described herein may encrypt the deduplicated data using a symmetric encryption key (provided, e.g., by a storage vendor) and/or using an encryption key that is derived from the deduplicated data itself so that a storage vendor may subsequently identify and eliminate or reduce redundant data across multiple customers.

In one example, the systems described herein may transfer the deduplicated data from the physical storage medium to the storage device at the second location in a deduplicated state. In other examples, the systems described herein may: 1) restore the deduplicated data to its original, non-deduplicated state and then 2) store the non-deduplicated data on the storage device.

As detailed above, by deduplicating data that is to be transferred via physical storage media from one location to another, the systems and methods described herein may reduce the storage space (and, potentially, the size and/or number of physical storage media) required to physically transport such data from one location to another. As such, these systems and methods may enable customers and/or storage vendors to reduce the expenses commonly associated with seeding or restoring backups or other forms of data to or from cloud-based or other online storage systems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for deduplicating data transferred via physical storage media. The term "deduplicate," as used herein, may refer to a method or process for reducing or eliminating redundant data by only storing a single instance of data (e.g., a data segment), potentially referencing each data instance multiple times. As will be described in greater detail below, a single instance of data may be referenced by a single data object (e.g., a file) or a plurality of data objects within a deduplicated data system.

Figure 1:
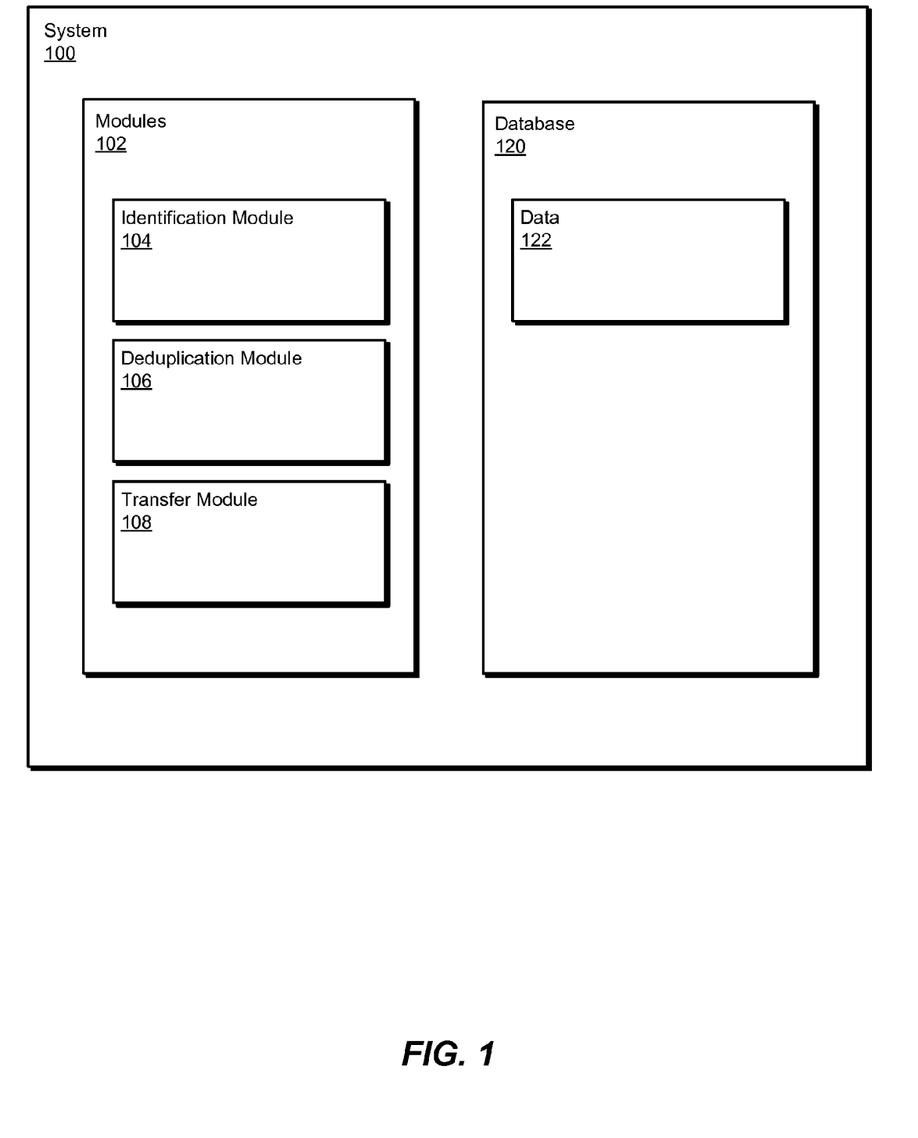
FIG. 1 is a block diagram of an exemplary system for deduplicating data transferred via physical storage media.
Figure 2:
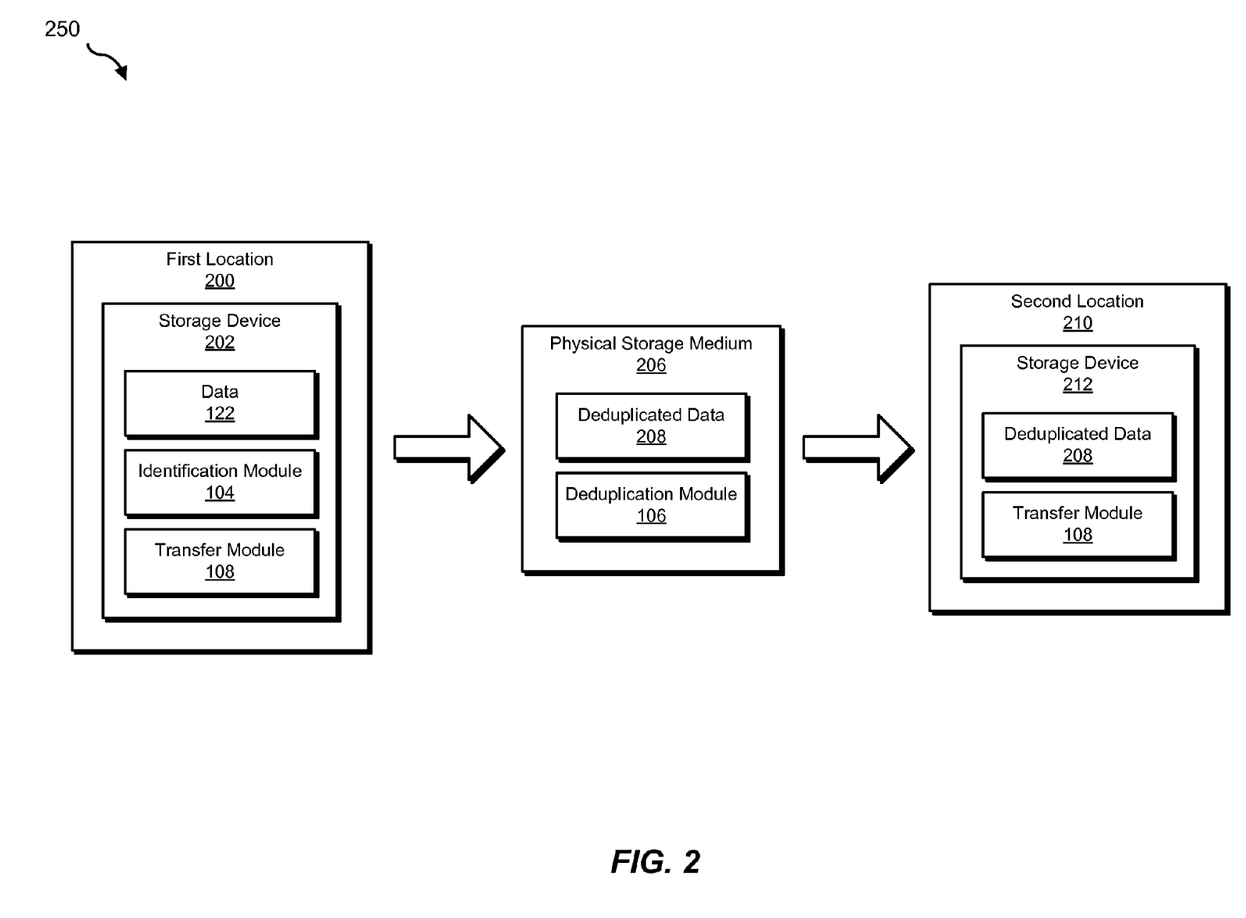
FIG. 2 is a block diagram of an exemplary system for deduplicating data transferred via physical storage media.
Figure 3:
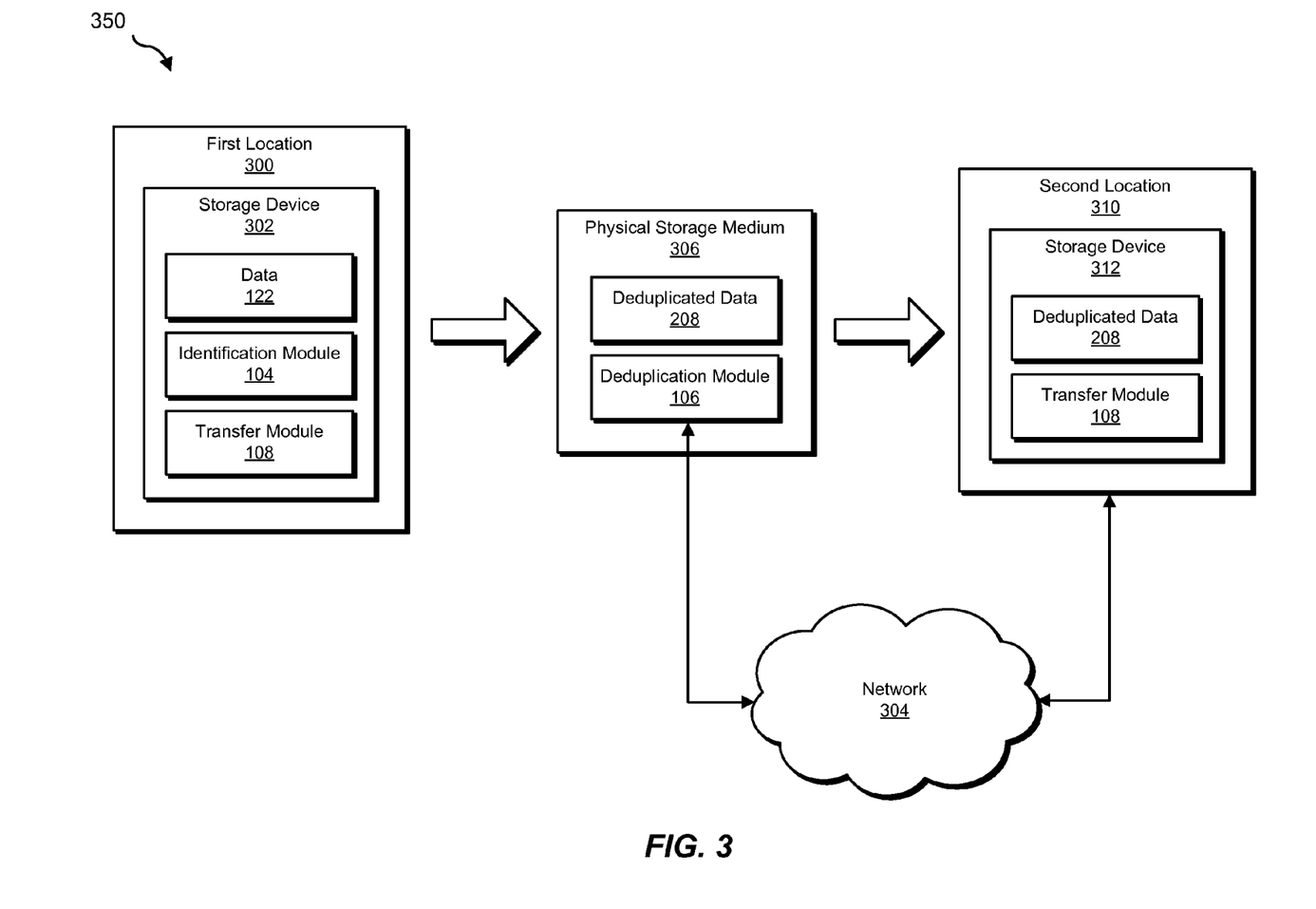
FIG. 3 is a block diagram of an exemplary system for deduplicating data transferred via physical storage media.

The following will provide, with reference to FIGS. 1-3, detailed descriptions of exemplary systems for deduplicating data transferred via physical storage media. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for deduplicating data transferred via physical storage media. As illustrated in this figure, exemplary system 100 may include one or more modules 102 for performing one or more tasks. For example, and as will be explained in greater detail below, exemplary system 100 may include an identification module 104 programmed to identify data stored at a first location that is to be transferred to a second location via a physical storage medium. Exemplary system 100 may also include a deduplication module 106 programmed to deduplicate the identified data.

In addition, and as will be described in greater detail below, exemplary system 100 may include a transfer module 108 programmed to: 1) store the deduplicated data on the physical storage medium and then 2) transfer the deduplicated data from the physical storage medium to a storage device at the second location after the physical storage medium has been transported from the first location to the second location. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIGS. 2-3 (e.g., computing devices at first locations 200 and 300 and/or second locations 210 and 310), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include data 122. As will be described in detail below, data 122 may represent data stored at a first location that is to be transferred to a second location via a physical storage medium (such as, e.g., data to be backed up to or restored from a cloud-based storage system).

Database 120 may represent portions of a single database or computing device or a plurality of databases or computing devices. For example, database 120 may represent a portion of the systems illustrated in FIGS. 2-3 (e.g., storage devices 202, 212, 302, and/or 312), computing system 510 in FIG. 5, and/or portions of exemplary network architecture 600 in FIG. 6. Alternatively, database 120 in FIG. 1 may represent one or more physically separate devices capable of being accessed by a computing device, such as the computing devices illustrated in FIGS. 2-3 (e.g., computing devices at first locations 200 and 300 and/or second locations 210 and 310), computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 250 in FIG. 2 and/or exemplary system 350 in FIG. 3. As shown in FIG. 2, system 250 may include a physical storage medium 206 that may be used to transfer data between a first location 200 and a second location 210.

In one embodiment, and as will be described in greater detail below, modules 102 from FIG. 1 may cause computing systems at first location 200 and/or second location 210 to deduplicate data to be transferred from first location 200 to second location 210 by physical storage medium 206. For example, modules 102 from FIG. 1 may cause computing systems at first location 200 and/or second location 210 to: 1) identify data (such as data 122) stored at first location 200 that is to be transferred to second location 210 via physical storage medium 206, 2) deduplicate the identified data 122, 3) store the deduplicated data 208 on physical storage medium 206, and then, after physical storage medium 206 has been physically transported from first location 200 to second location 210, 4) transfer deduplicated data 208 from physical storage medium 206 to a storage device 212 at second location 210.

First and second locations 200 and 210 generally represent physical locations between which data may be transferred via physical storage mediums. In one example, first location 200 may represent the location where a customer's data is stored and second location 210 may represent the location where a cloud-based or other online storage system resides. Alternatively, first location 200 may represent the location where a cloud-based storage or other online storage system resides and second location 210 may represent the location where a customer's data is stored.

Storage devices 202 and 212 generally represent any type or form of storage device or medium capable of storing data and/or other computer-readable instructions. Examples of storage devices 202 and 212 include, without limitation, magnetic disk drives (e.g., so-called hard drives), magnetic tape drives, optical disk drives, flash drives, or the like. In some examples, storage devices 202 and 212 may represent a plurality of storage devices, such as storage devices within a data center.

In some examples, storage devices 202 and 212 may be accessed by one or more computing devices located at first and second locations 200 and 210, respectively. These computing devices may represent any type or form of computing device capable of reading computer-executable instructions. Examples of such computing devices include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Similarly, physical storage medium 206 may represent any type or form of storage device or medium capable of storing data and/or other computer-readable instructions. Examples of physical storage medium 206 include, without limitation, magnetic disk drives, magnetic tape media, optical media, flash media, or the like.

Figure 4:
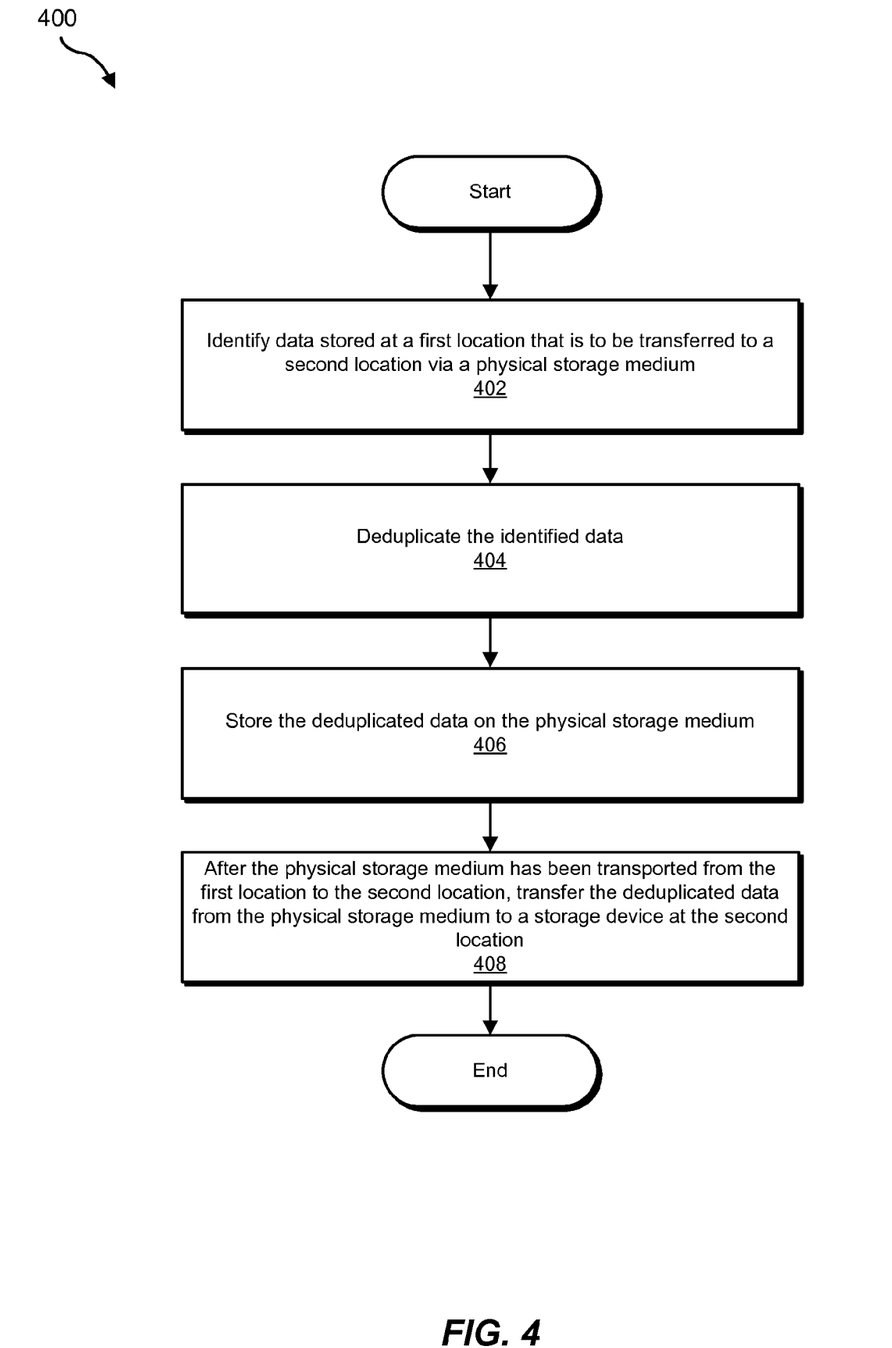
FIG. 4 is a flow diagram of an exemplary method for deduplicating data transferred via physical storage media.

FIG. 4 is a flow diagram of an exemplary computer-implemented method 400 for deduplicating data transferred via physical storage media. The steps shown in FIG. 4 may be performed by any suitable computer-executable code and/or computing system. In some embodiments, the steps shown in FIG. 4 may be performed by one or more of the components of system 100 in FIG. 1, system 250 in FIG. 2, system 350 in FIG. 3, computing system 510 in FIG. 5, and/or portions of exemplary network architecture 600 in FIG. 6.

As illustrated in FIG. 4, at step 402 one or more of the various systems described herein may identify data stored at a first location that is to be transferred to a second location via a physical storage medium. For example, identification module 104 in FIG. 1 may, as part of a computing system at first location 200 in FIG. 2, identify data 122 that is to be transferred to second location 210 via a physical storage medium, such as physical storage medium 206.

The systems described herein may identify data that is to be transferred from a first location to a second location via a physical storage medium in a variety of contexts. For example, identification module 104 may identify data stored at first location 200 that is to be backed up to, restored to, or otherwise transferred (e.g., for archival purposes or the like) to second location 210 via a physical storage medium, such as physical storage medium 206. In some examples, identification module 104 may perform step 402 at the request of an application, such as a backup/restore or archiving application. In other examples, identification module 104 may perform step 402 at the request of a user, such as a user of a computing system at first location 200 in FIG. 2.

The data identified in step 402 may be stored on a single storage device or a plurality of storage devices. For example, identification module 104 may, when performing step 402, identify data stored on one or more storage devices (such as storage device 202 in FIG. 2) utilized by one or more computing systems located at first location 200 in FIG. 2.

Returning to FIG. 4, at step 404 the various systems described herein may deduplicate the data identified in step 402. For example, deduplication module 106 may, as part of one or more computing systems located at first location 200 in FIG. 2, deduplicate data 122 in order to reduce the amount of data to be stored on physical storage medium 206 and transferred to second location 210.

The systems described herein may deduplicate the data identified in step 402 using any type or form of data deduplication algorithm or technique. Examples of the types of deduplication applications that may be used to deduplicate the data identified in step 402 include, without limitation, SYMANTEC'S NETBACKUP PUREDISK, IBM'S PROTECTIER, NEC'S HYDRASTORE, or the like.

In some examples, the systems described herein may deduplicate the data identified in step 402 using a deduplication agent stored on the physical storage medium. For example, physical storage medium 206 in FIG. 2 (which may, as detailed above, represent a storage medium provided by a storage vendor to a customer for transferring data from first location 200 to second location 210) may contain deduplication module 106 (preloaded, e.g., by the storage vendor). As detailed above, deduplication module 106 may represent a deduplication application (such as SYMANTEC'S NETBACKUP PUREDISK) provided by a storage vendor associated with second location 210. In this example, one or more computing systems at first location 200 may deduplicate data 122 using the deduplication module 106 preloaded by the storage vendor on physical storage medium 206.

The systems described herein may perform step 404 at any suitable point in time. In some examples, deduplication module 106 may deduplicate data 122 before this data is stored on physical storage medium 206. In other examples, deduplication module 106 may deduplicate data 122 after this data has been stored on physical storage medium 206.

The systems described herein may deduplicate data stored on a single or a plurality of storage devices accessed by a single or a plurality of computing systems. For example, deduplication module 106 may deduplicate data associated with a single client or data associated with a plurality of clients within an enterprise.

In some examples, the systems described herein may, during the deduplication process of step 404, determine whether an instance of at least one data element within the identified data has been previously transferred to the storage device at the second location. For example, as illustrated in FIG. 3, deduplication module 106 may query storage device 312 at second location 310 via network 304 in FIG. 3 in order to determine whether an instance of at least one data segment within data 122 has been previously stored (by, e.g., the customer associated with first location 300 and/or by an additional customer) on storage device 312 (e.g., the storage vendor's data center). In this example, network 304 may represent any medium or architecture capable of facilitating communication or data transfer, such as an intranet, a wide area network, a local area network, a personal area network, the Internet, power line communications, a cellular network, exemplary network architecture 600 in FIG. 6, or the like.

If deduplication module 106 determines that an instance of at least one data segment within data 122 has been previously stored (by, e.g., the same or an another customer) on storage device 312 at second location 310, then the systems described herein may create a reference on physical storage medium 306 to the identified instance of the data segment stored on storage device 312, as opposed to storing a copy of the identified data segment on physical storage medium 306, in order to conserve storage space on physical storage medium 306.

The systems described herein may determine whether an instance of at least one data segment within the data identified in step 402 has been previously stored on the storage device of the second location in a variety of ways. For example, deduplication module 106 may identify redundant data segments within data 122 in FIG. 3 by, for each data segment within data 122: 1) creating a hash of the data segment, 2) using the hash to query storage device 312 at second location 310, and then 3) receiving a response from storage device 312 that indicates whether an instance of the data segment in question has been previously stored (by, e.g., the customer associated with first location 300 and/or an additional customer of the storage vendor associated with second location 310) on storage device 312.

Returning to FIG. 4, at step 406 the systems described herein may store the deduplicated data from step 404 on the physical storage medium. For example, transfer module 108 may, as part of one or more computing systems located at first location 200 in FIG. 2, store deduplicated data 208 on physical storage medium 206.

The systems described herein may perform step 406 in a variety of ways. For example, as detailed above, physical storage medium 206 may represent one or more storage mediums. As such, transfer module 108 may store deduplicated data 208 in step 406 on one or more physical storage mediums.

In some examples, the systems described herein may store the deduplicated data on the physical storage medium in an encrypted format. In one example, this encrypted format may permit cross-client deduplication. For example, transfer module 108 may encrypt deduplicated data 208 using a symmetric encryption key (located, e.g., on physical storage medium 206 and/or otherwise provided by a storage vendor associated with second location 210) and/or using an encryption key that is derived from deduplicated data 208 itself, such that a storage vendor (such as the storage vendor associated with second location 210 in FIG. 2) may be able to later identify and eliminate redundant data segments across a plurality of customers.

Returning to FIG. 4, at step 408 the systems described herein may, after the physical storage medium has been physically transported from the first location to the second location, transfer the deduplicated data from the physical storage medium to a storage device at the second location. For example, transfer module 108 may, as part of one or more computing systems located at second location 210 in FIG. 2, transfer deduplicated data 208 from physical storage medium 206 to storage device 212 at second location 210 in FIG. 2.

The systems described herein may perform step 408 in a variety of ways. In one example, transfer module 108 may store deduplicated data 208 on storage device 212 in a deduplicated state (i.e., deduplication module 106 and/or transfer module 108 may refrain from restoring deduplicated data 208 to its original, non-deduplicated state prior to storing the same on storage device 212). In another example, deduplication module 106 and/or transfer module 108 may: 1) restore the deduplicated data 208 to its original, non-deduplicated state and then 2) store this non-deduplicated data on storage device 212. Upon completion of step 408, exemplary method 400 in FIG. 4 may terminate.

As detailed above, by deduplicating data that is to be transferred via physical storage media from one location to another, the systems and methods described herein may reduce the storage space (and, potentially, the size and/or number of physical storage media) required to physically transport such data from one location to another. As such, these systems and methods may enable customers and/or storage vendors to reduce the expenses commonly associated with seeding or restoring backups or other forms of data to or from cloud-based or other online storage systems.

Figure 5:
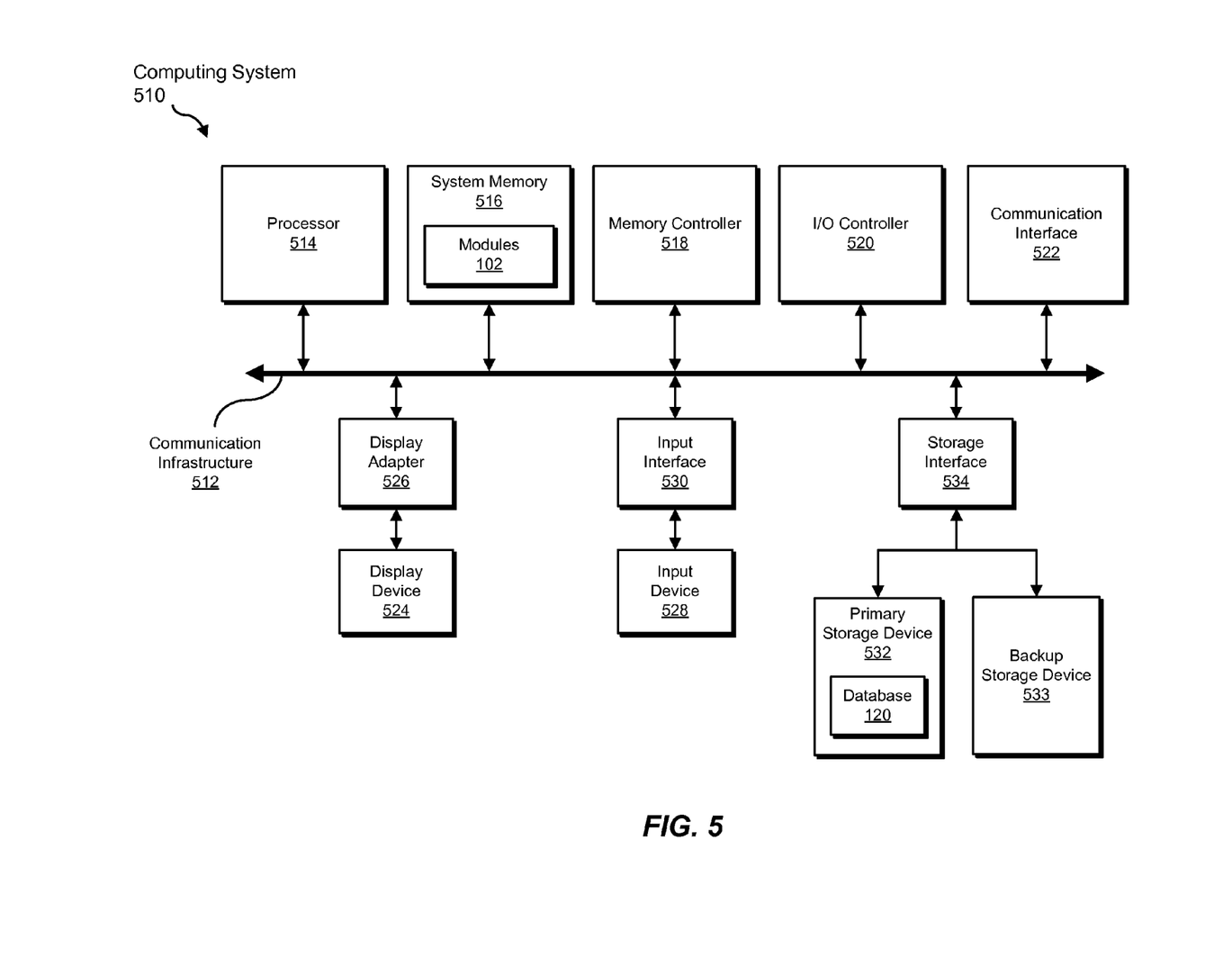
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, deduplicating, storing, transferring, determining, creating, using, receiving, encrypting, and restoring steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, deduplicating, storing, transferring, determining, creating, using, receiving, encrypting, and restoring.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, deduplicating, storing, transferring, determining, creating, using, receiving, encrypting, and restoring steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, deduplicating, storing, transferring, determining, creating, using, receiving, encrypting, and restoring steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, deduplicating, storing, transferring, determining, creating, using, receiving, encrypting, and restoring steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, deduplicating, storing, transferring, determining, creating, using, receiving, encrypting, and restoring steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
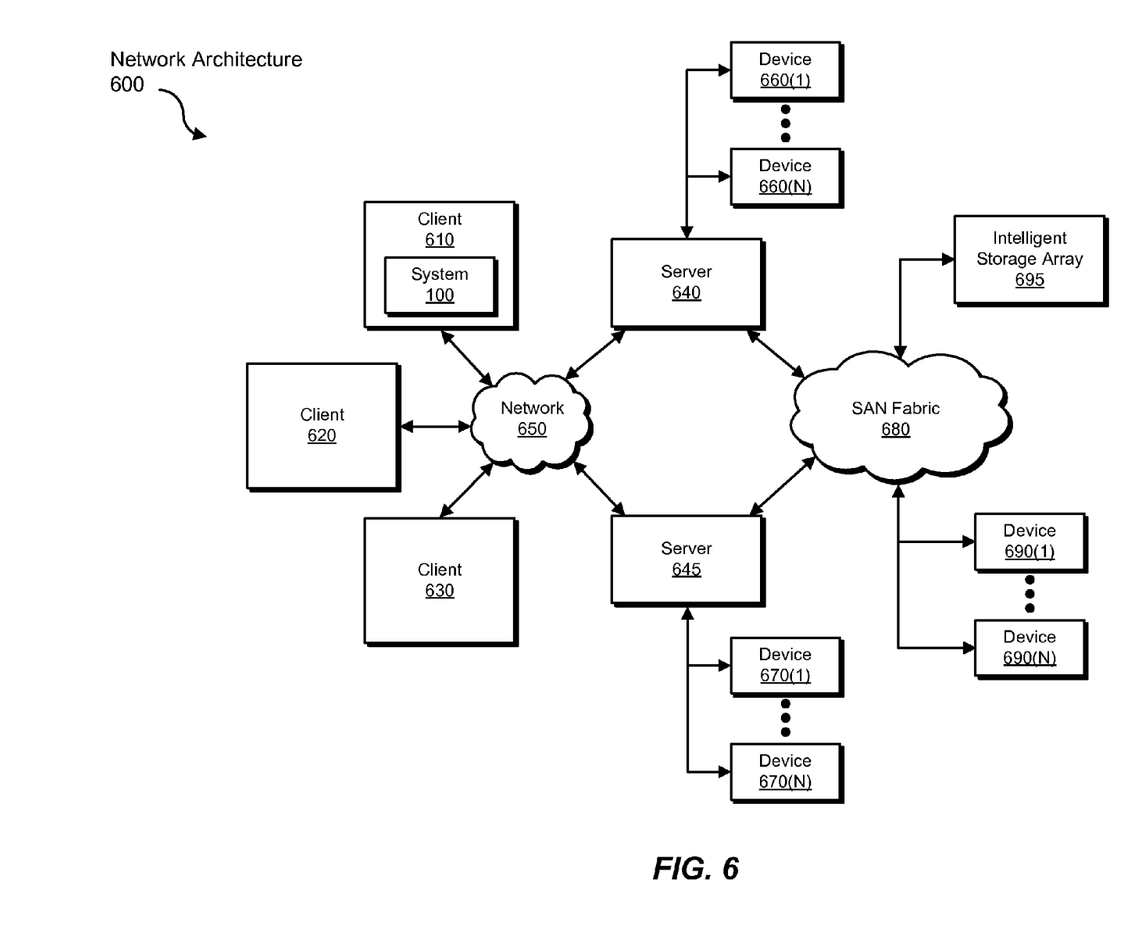
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, deduplicating, storing, transferring, determining, creating, using, receiving, encrypting, and restoring steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for deduplicating data transferred via physical storage media. In one example, such a method may include: 1) identifying data stored at a first location that is to be transferred to a second location via a physical storage medium, 2) deduplicating the identified data, 3) storing the deduplicated data on the physical storage medium, and then, after the physical storage medium has been transported from the first location to the second location, 4) transferring the deduplicated data from the physical storage medium to a storage device at the second location.

In some examples, identifying the data may include identifying data stored at the first location that is to be backed up or restored to the second location via the physical storage medium. In one example, deduplicating the identified data may include: 1) identifying a deduplication agent stored on the physical storage medium and then 2) deduplicating the identified data using the deduplication agent. In addition, deduplicating the identified data may include deduplicating the identified data prior or subsequent to storing the identified data on the physical storage medium.

In some examples, deduplicating the identified data may include: 1) determining that an instance of at least one data segment within the identified data is stored on the storage device at the second location and then 2) creating a reference to the instance of the data segment that is stored on the storage device at the second location. In addition, determining that an instance of at least one data segment within the identified data is stored on the storage device at the second location may include: 1) creating a hash of the data segment, 2) using the hash to query the storage device at the second location, and then 3) receiving a response from the storage device that indicates that an instance of the data segment is stored on the storage device.

In some embodiments, storing the deduplicated data on the physical storage medium may include encrypting the deduplicated data using a symmetric encryption key and/or using an encryption key that is derived from the deduplicated data. In one example, transferring the deduplicated data from the physical storage medium to the storage device at the second location may include storing the deduplicated data on the storage device in a deduplicated state. In another example, transferring the deduplicated data from the physical storage medium to the storage device at the second location may include: 1) restoring the deduplicated data to a non-deduplicated state and then 2) storing the non-deduplicated data on the storage device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, deduplication module 106 in FIGS. 1-3 may transform a property or characteristic of data 122 and/or physical storage medium 206 or 306 by deduplicating data 122 and then storing the same on physical storage media 206 or 306.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for deduplicating data transported via physical storage media, at least a portion of the method being performed by a computing device comprising at least one processor, the method comprising:
   identifying data stored on a storage device at a first physical location that is to be:
      transferred to a physical storage medium that is external to the storage device at the first physical location; and
      physically transported from the first physical location to a second physical location via the physical storage medium;
   identifying a deduplication agent preloaded onto the physical storage medium by a storage vendor;
   deduplicating the identified data using the deduplication agent preloaded onto the physical storage medium by the storage vendor, wherein deduplicating the identified data comprises:
      determining that an instance of at least one data segment within the identified data is stored on a storage device at the second physical location that is external to the physical storage medium;
      creating, on the physical storage medium that is physically transported from the first location to the second location, a reference to the instance of the data segment that is stored on the storage device at the second physical location as opposed to storing the data segment on the physical storage medium;
   storing the deduplicated data on the physical storage medium;
   after the physical storage medium has been physically transported from the first physical location to the second physical location via the physical storage medium, transferring the deduplicated data from the physical storage medium to the storage device at the second physical location.

2. The method of claim 1, wherein identifying the data comprises at least one of:
   identifying data stored on the storage device at the first physical location that is to be backed up to the storage device at the second physical location via the physical storage medium;
   identifying data stored on the storage device at the first physical location that is to be restored to the storage device at the second physical location via the physical storage medium.

3. The method of claim 1, wherein deduplicating the identified data comprises one of:
   deduplicating the identified data prior to storing the identified data on the physical storage medium;
   deduplicating the identified data subsequent to storing the identified data on the physical storage medium.

4. The method of claim 1, wherein determining that an instance of the data segment is stored on the storage device at the second physical location comprises:
   creating a hash of the data segment;
   using the hash to query the storage device at the second physical location;

receiving a response from the storage device at the second physical location that indicates that an instance of the data segment is stored on the storage device at the second physical location.

5. The method of claim 1, wherein storing the deduplicated data on the physical storage medium comprises at least one of:
   encrypting the deduplicated data using a symmetric encryption key;
   encrypting the deduplicated data using an encryption key that is derived from the deduplicated data.

6. The method of claim 1, wherein transferring the deduplicated data from the physical storage medium to the storage device at the second physical location comprises storing the deduplicated data on the storage device at the second physical location in a deduplicated state.

7. The method of claim 1, wherein transferring the deduplicated data from the physical storage medium to the storage device at the second physical location comprises:
   restoring the deduplicated data to a non-deduplicated state;
   storing the non-deduplicated data on the storage device at the second physical location.

8. A system for deduplicating data transported via physical storage media, the system comprising:
   an identification module programmed to identify data stored on a storage device at a first physical location that is to be:
      transferred to a physical storage medium that is external to the storage device at the first physical location; and
      physically transported from the first physical location to a second physical location via the physical storage medium;
   a deduplication module preloaded onto the physical storage medium by a storage vendor, wherein the deduplication module is programmed to deduplicate the identified data at least in part by:
      determining that an instance of at least one data segment within the identified data is stored on a storage device at the second physical location that is external to the physical storage medium;
      creating, on the physical storage medium that is physically transported from the first location to the second location, a reference to the instance of the data segment that is stored on the storage device at the second physical location as opposed to storing the data segment on the physical storage medium;
   a transfer module programmed to:
      store the deduplicated data on the physical storage medium;
      transfer the deduplicated data from the physical storage medium to the storage device at the second physical location after the physical storage medium has been physically transported from the first physical location to the second physical location via the physical storage medium;
   at least one processor configured to execute the identification module, the deduplication module, and the transfer module.

9. The system of claim 8, wherein the identification module identifies the data by at least one of:
   identifying data stored on the storage device at the first physical location that is to be backed up to the storage device at the second physical location via the physical storage medium;
   identifying data stored on the storage device at the first physical location that is to be restored to the storage device at the second physical location via the physical storage medium.

10. The system of claim 8, wherein the deduplication module deduplicates the identified data prior to the transfer module storing the identified data on the physical storage medium.

11. The system of claim 8, wherein the deduplication module deduplicates the identified data subsequent to the transfer module storing the identified data on the physical storage medium.

12. The system of claim 8, wherein the deduplication module determines that an instance of the data segment is stored on the storage device at the second physical location by:
   creating a hash of the data segment;
   using the hash to query the storage device at the second physical location;
   receiving a response from the storage device at the second physical location that indicates that an instance of the data segment is stored on the storage device at the second physical location.

13. The system of claim 8, wherein the transfer module stores the deduplicated data on the physical storage medium by at least one of:
   encrypting the deduplicated data using a symmetric encryption key;
   encrypting the deduplicated data using an encryption key that is derived from the deduplicated data.

14. The system of claim 8, wherein the transfer module transfers the deduplicated data from the physical storage medium to the storage device at the second physical location by storing the deduplicated data on the storage device at the second physical location in a deduplicated state.

15. The system of claim 8, wherein the transfer module transfers the deduplicated data from the physical storage medium to the storage device at the second physical location by:
   restoring the deduplicated data to a non-deduplicated state;
   storing the non-deduplicated data on the storage device at the second physical location.

16. A non-transitory computer-readable-storage medium comprising one or more computer-executable instructions that, when executed by at least one processor of a computing device, cause the computing device to:
   identify data stored on a storage device at a first physical location that is to be:
      transferred to a physical storage medium that is external to the storage device at the first physical location; and
      physically transported from the first physical location to a second physical location via the physical storage medium;
   identify a deduplication agent preloaded onto the physical storage medium by a storage vendor;
   deduplicate the identified data using the deduplication agent preloaded onto the physical storage medium by the storage vendor, wherein deduplicating the identified data comprises:
      determining that an instance of at least one data segment within the identified data is stored on a storage device at the second physical location that is external to the physical storage medium;
      creating, on the physical storage medium that is physically transported from the first location to the second location, a reference to the instance of the data segment that is stored on the storage device at the second physical location as opposed to storing the data segment on the physical storage medium;

store the deduplicated data on the physical storage medium;

transfer the deduplicated data from the physical storage medium to the storage device at the second physical location after the physical storage medium has been physically transported from the first physical location to the second physical location via the physical storage medium.

* * * * *